May 12, 1931. R. A. WALTER 1,804,577

DRIVING MECHANISM

Original Filed March 5, 1927

Raymond A. Walter
Inventor

By Attorney

Patented May 12, 1931

1,804,577

UNITED STATES PATENT OFFICE

RAYMOND A. WALTER, OF NEW YORK, N. Y., ASSIGNOR TO CONVEYOR SALES COMPANY, OF NEW YORK, N. Y., A CORPORATION OF NEW YORK

DRIVING MECHANISM

Application filed March 5, 1927, Serial No. 173,136. Renewed April 24, 1930.

This invention relates in general to devices for imparting reciprocating motion and more particularly has reference to a driving mechanism for reciprocating conveyors.

Another object of this invention is to provide a driving mechanism for reciprocating conveyors adapted to afford the maximum conveyance of material without backward slippage.

Still another object of this invention is to provide a driving mechanism for reciprocating conveyors operating with a minimum of power loss.

A further object of this invention is to provide a driving mechanism for reciprocating conveyors adapted to allow transport in the desired direction, irrespective of the direction of the revolutions of the gear.

A still further object of this invention is to provide a driving mechanism for reciprocating conveyors in which widely distributed stresses and uniform wear are obtained.

Still a further object of this invention is to provide a driving mechanism for reciprocating conveyors of compact design and simple structure.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of this specification:

Figure 1:
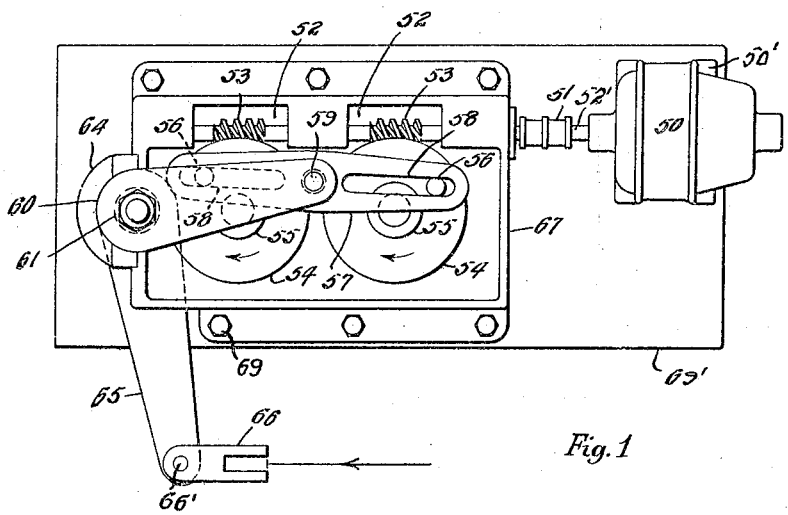
Figure 1 is a top plan view of the driving mechanism.
Figure 2:
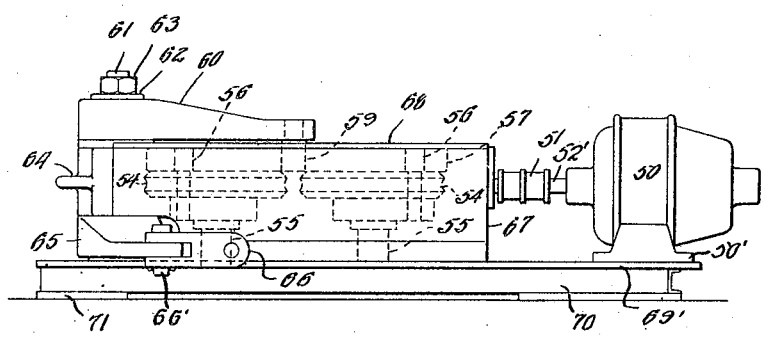
Fig. 2 is a side elevational view of the driving mechanism.

The improved conveyor driving mechanism forming the subject matter of this invention, as shown in Figs. 1 and 2, comprises a prime mover 50 having a drive shaft 52'. The motor shown is an electric motor, a source of power that is deemed to possess the greatest utility in driving mechanisms of this character, but it is to be distinctly understood that this invention is not limited to any particular motor as it may readily be driven by any desired mechanisms, such as compressed air or steam driven engines, internal combustion motors or any type of engine or motor deemed most suitable for the particular requirements.

A shaft 52 is coupled to the drive shaft 52' by a coupling 51, preferably securely keyed or joined by a suitable means to insure against back lash. The shaft 52 is journaled in bearings mounted in a housing 67. The housing 67 also acts as a casing for the entire driving mechanism. The bearing boxes may be made integral with the housing or mounted separately therein to suit the particular design.

Worm gears 53 are mounted on the shaft in coaxial alignment and held firmly thereon by keys or any preferred form of mounting. The worm gears 53 are adapted to mesh in horizontal revolving gears 54, suitably held in vertical bearings 55 mounted on a base 69' adapted to support the assembled mechanisms.

The worm gears are provided with fixedly mounted vertical wrist pins 56 protruding from their faces and particularly positioned in a manner to be hereinafter described. The wrist pins are adapted to receive a motion translating member 58 centrally pivoted to a lever 60 by a pin 59.

The motion translating member 58 is formed as a bar and provided with aligned extending slots to receive the wrist pins 56. The slotted bar operating on the wrist pins 56 is adapted to translate the rotative motion imparted by the prime mover 50 through the gears 54 into reciprocatory motion.

The lever 60 is fixed to the upper end of a shaft 61 in any suitable manner and held by a washer 62 and a nut 63. The end of the shaft 61 is threaded to receive the nut 63.

The shaft 61 is journaled in a heavy bearing 64 mounted on the base 69'. A lever 65 is fixed to the lower end of the shaft 61 in the same manner as the lever 60 or by any other preferable mode of attachment. The lever 60 is mounted on the shaft 61 at substantially right angles to the lever 65, forming in organization a bell crank lever.

A clevis 66 is pivoted on the end of the lever 65, by a pivot 66' to afford connections to a conveyor or other apparatus. This form of connection is shown as an example only as it is obvious that any other desired connection might be easily substituted.

The mechanism is encased in the housing 67 having a top 68 to prevent foreign matter from entering and retarding the operation of the mechanism and to form a protective shield against operative inadvertence. The base 69' is preferably mounted on standards 71 but it is to be understood that the invention is in nowise restricted to this form of mounting as it is obvious that this factor rests in the requirements of the designer.

The wrist pins 56 on the gears 54 do not bear the same relative position to the vertical bearings 55. As shown in Figure 1, the wrist pins 56 on the right hand gear 54, is positioned approximately one third of the revolution ahead of the pin on the left hand gear 54. It is the advanced position of the wrist pin 56 which imparts the balanced components of reciprocating motion illustrated in Figure 4.

Figure 3:
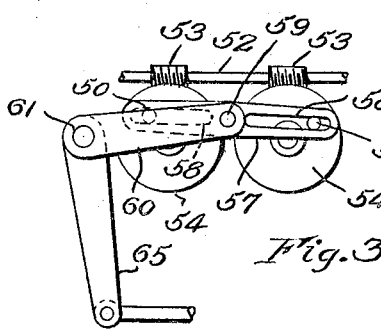
Fig. 3 is a side elevation schematic view of the improved driving gear forming the subject matter of this invention.
Figure 4:
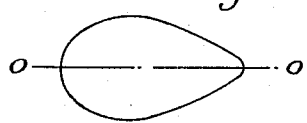
Fig. 4 is a graph of the motion imparted by the improved driving gear shown in Figure 3.

The operation of this inventon may be readily understood having reference to Figures 3 and 4. In the velocity diagram in Figure 4, it will be noted that the forward stroke of the conveyor begins gradually. The forward stroke is sufficiently gradual so that no backward slippage of the material results at any portion of its travel. The reverse stroke is exactly symmetrical to the forward stroke, thus attaining a balanced velocity diagram.

By changing the relative forward position of the pin 56 on the right hand wheel 54, with respect to the left hand wheel 54, there may be attained strokes of various degrees of intensity and of various lengths, or if desired they may be so positioned as to cause the conveyor to carry material in the reverse direction.

By regulating the advance of the pin on the right hand wheel 54, between 60° and 120° ahead of that of the left hand wheel, widely varied types and lengths of strokes in the direction indicated by the arrows in Fig. 1 may be obtained. By advancing the same pin on the left hand wheel over the same latitudes ahead of that on the right hand wheel, a like variation of types and lengths of strokes may be obtained and transport in the reversed direction effected. The length of the stroke and the power consumed may be closely regulated by shifting the relative position of the two gears 54 allowing the circumference to be worn out on all portions at a uniform rate, in that the cranks do not bear a fixed relation to each other.

There is provided by this invention a driving mechanism for reciprocating conveyors of simple structure and compact design, allowing wide distribution of stresses on the gear elements and having provisions for changing their relationship to effect uniform wear. There is also attained a driving mechanism adapted to impart a motion having a perfectly balanced velocity diagram approaching the theoretically ideal stroke within practical limits, affording more efficient transport and allowing reversal in direction of transport to be effected.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A conveyor drive comprising a prime mover, a shaft coupled to the prime mover, aligned worm gears mounted on the shaft, ring gears in engagement with the worm gears, wrist pins fixed on the ring gears, a bar having slots to receive the wrist pins, sliding on the ring gears, a bell crank operated by the sliding bar, and means to attach the drive to a conveyor.

2. A conveyor drive comprising a base seating a prime mover, a shaft coupled to the prime mover, worm gears mounted on the shaft, horizontally disposed ring gears in engagement with the worm gears, wrist pins fixed on the ring gears, a bar having slots to receive the wrist pins sliding on the ring gears, a housing fitting over the base, a bell crank operated by the sliding bar outside the housing and a clevis on the bell crank to affix the drive to a conveyor.

3. A conveyor drive comprising a pair of revolving members rotating in the same direction, the relative position of said members being capable of variation whereby the stroke of the conveyor may be regulated, a sliding bar engaged by the rotating members and a bell crank operated by the sliding bar.

4. A conveyor drive comprising a pair of rotating cranks, said cranks occupying a different relative position capable of variation, a bell crank, and means in engagement with the rotating cranks to operate the bell crank.

5. A conveyor drive comprising a pair of revolving members rotating in the same direction, independently mounted means to impart backward and forward strokes of reciprocating motion and means carried by the revolving members eccentrically mounted with respect thereto connected to the reciprocating motion imparting means for driving the same.

6. A conveyor drive comprising a pair of rotating cranks revolving in the same direction, independently mounted means to impart backward and forward strokes of reciprocating motion and means carried by the cranks directly connected thereto for operating the same.

7. A conveyor drive comprising a pair of revolving members rotating in the same direction, and independently mounted motion imparting member, and means carried by the revolving members to drive the motion imparting member adapted to impart thereto a forward stroke gradually accelerated for substantially two-thirds its length and rapidly retarded the remainder of the stroke, and a backward stroke rapidly accelerated for substantially one-third its length and gradually retarded for the remainder of the stroke.

8. A conveyor drive comprising a pair of rotating cranks revolving in the same direction, independently mounted motion imparting means, and means carried by the cranks connected to the motion imparting means to impart reverse uniformly long and short backward and forward strokes of reciprocating motion.

9. A conveyor drive comprising a pair of rotating cranks revolving in the same direction, the cranks being in offset relation with respect to one another and relatively slidable means carried thereby for driving a reciprocating motion imparting member.

10. A conveyor drive comprising a pair of rotating crank arms revolving in the same direction, the crank arms being in offset relation, a reciprocating motion imparting member, and a slotted bar carried by the crank arms and connected thereto to drive the same, the offset relation of the same by reason of the crank arms being adapted to drive the slotted bar to afford backward and forward strokes of reciprocating motion changing in acceleration.

In testimony whereof I affix my signature.

RAYMOND A. WALTER.